UNITED STATES PATENT OFFICE.

JAMES A. CUTTING, OF BOSTON, MASSACHUSETTS.

IMPROVEMENT IN THE PREPARATION OF COLLODION FOR PHOTOGRAPHIC PICTURES.

Specification forming part of Letters Patent No. 11,213, dated July 4, 1854.

*To all whom it may concern:*

Be it known that I, JAMES A. CUTTING, of the city of Boston, county of Suffolk, and State of Massachusetts, have invented a new and useful Improvement in Positive Photographic Pictures on Glass; and I do hereby declare the following to be an exact description thereof.

The nature of my invention consists in the use of gum-camphor, in addition to the exciting materials, in the preparation of collodion for positive photographic pictures on glass.

To enable others skilled in the art to make and use my invention, I will proceed to describe the process, as follows:

Having prepared the collodion in the usual manner, I take a pint bottle in which I introduce twelve ounces of collodion, to which I add one dram of iodide of potassium dissolved in alcohol. I then shake the mixture thoroughly, and add thereto eighteen grains of refined gum-camphor, shaking the mixture again until the whole is combined, then allow it to settle, when it is fit for use.

The advantages of my improvement consist in the increased vigor of the delineations of the half-tones of positive pictures on glass, giving greater depth and rotundity thereto, which renders this combination exceedingly useful for microscopic pictures, as well as the ordinary purposes of portraiture.

I would have it understood that the combination of camphor with iodide of potassium and collodion, as above specified, is adapted solely to the production of positive pictures on glass, and not to the production of negative pictures on glass, from which positive pictures on paper may be printed, as a sufficient degree of opacity is not thus afforded for that purpose.

What I claim as my invention, and desire to secure by Letters Patent, is—

The use of camphor in combination with iodized collodion, as set forth in the specification.

JAMES A. CUTTING.

Witnesses:
SAML. GRUBB,
J. REHN.